United States Patent
Jain et al.

(10) Patent No.: US 12,093,243 B1
(45) Date of Patent: Sep. 17, 2024

(54) METADATA QUALITY MONITORING AND REMEDIATION

(71) Applicant: Wells Fargo Bank, N.A., San Francisco, CA (US)

(72) Inventors: Rajiv Kumar Jain, Lexington, MA (US); Christopher James McBrayer, Tega Cay, SC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/151,690

(22) Filed: Jan. 9, 2023

(51) Int. Cl.
*G06F 17/00* (2019.01)
*G06F 16/215* (2019.01)
*G06F 16/23* (2019.01)

(52) U.S. Cl.
CPC ........ *G06F 16/2365* (2019.01); *G06F 16/215* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 7,689,599 B1* | 3/2010 | Shah | ................. | G06F 11/1471 |
| | | | | 707/694 |
| 8,266,115 B1* | 9/2012 | Park | ................. | G06F 16/951 |
| | | | | 707/749 |
| 8,600,953 B1* | 12/2013 | Gerber | ................. | G06F 11/1458 |
| | | | | 707/687 |
| 9,065,827 B1* | 6/2015 | Taylor | ................. | H04L 67/535 |
| 9,152,353 B1* | 10/2015 | Wang | ................. | G06F 11/1435 |
| 9,262,451 B1 | 2/2016 | Singh et al. | | |
| 9,529,851 B1 | 12/2016 | Smith | | |
| 9,558,068 B1* | 1/2017 | Bono | ................. | G06F 11/1435 |
| 10,936,215 B2 | 3/2021 | Kilari | | |
| 10,963,507 B1* | 3/2021 | Jahan | ................. | G06F 16/24568 |
| 11,086,827 B1* | 8/2021 | Saninanee | ................. | G06F 16/211 |
| 11,310,250 B2 | 4/2022 | Kursun | | |
| 11,561,976 B1* | 1/2023 | Buchmann | ................. | G06F 16/214 |
| 2009/0282060 A1* | 11/2009 | Paulussen | ................. | G06F 16/41 |
| 2012/0284738 A1* | 11/2012 | Narasimhan | ................. | H04H 20/38 |
| | | | | 725/16 |
| 2015/0100578 A1* | 4/2015 | Rosen | ................. | G06F 16/907 |
| | | | | 707/737 |

(Continued)

OTHER PUBLICATIONS

Fan, Wenfei, "Data Quality: From Theory to Practice", ACM SIGMOD Record, vol. 44, Issue 3, Sep. 2015, pp. 7-18, (Sep. 2015), 12 pgs.

(Continued)

*Primary Examiner* — Hung D Le
(74) *Attorney, Agent, or Firm* — SCHWEGMAN LUNDBERG & WOESSNER, P.A.

(57) ABSTRACT

Systems and techniques for metadata quality monitoring and remediation are described herein. Metadata is obtained from a system of record. The metadata is normalized. The metadata is evaluated with an integrity rule to identify a discrepancy in an element of the metadata. The discrepancy is stored as an integrity gap in an integrity database. A notification is generated that includes identification of the element of the metadata and a description of the integrity rule. The notification is transmitted to a user identified based on the integrity rule.

24 Claims, 5 Drawing Sheets

(56) References Cited

U.S. PATENT DOCUMENTS

| | | | |
|---|---|---|---|
| 2015/0310055 A1* | 10/2015 | Derstadt | G06F 16/2365 |
| | | | 707/687 |
| 2015/0379001 A1* | 12/2015 | Gunningham | G06F 16/5838 |
| | | | 707/722 |
| 2016/0335176 A1* | 11/2016 | Cantrell, Jr. | G06F 11/3696 |
| 2017/0026254 A1* | 1/2017 | Adylov | G06F 18/22 |
| 2019/0311610 A1* | 10/2019 | Jessop | H04Q 9/00 |
| 2020/0175445 A1 | 6/2020 | Prabhakar et al. | |
| 2020/0242102 A1 | 7/2020 | Kain | |
| 2020/0286025 A1 | 9/2020 | Ramchandran | |
| 2020/0320632 A1 | 10/2020 | Teboul et al. | |
| 2020/0387533 A1* | 12/2020 | Nolte | G06F 40/279 |
| 2021/0233193 A1* | 7/2021 | Blackburn | G06F 16/164 |
| 2021/0248144 A1 | 8/2021 | Haile | |
| 2021/0279215 A1 | 9/2021 | Nath et al. | |
| 2021/0286663 A1* | 9/2021 | Thomas | G06F 11/076 |
| 2021/0326313 A1 | 10/2021 | Kirn | |
| 2022/0058196 A1* | 2/2022 | Stoafer | G06F 16/38 |
| 2022/0114149 A1* | 4/2022 | Akkapeddi | G06F 16/213 |
| 2022/0141276 A1* | 5/2022 | Sun | H04L 67/535 |
| | | | 709/219 |
| 2022/0147509 A1 | 5/2022 | Muddu et al. | |
| 2022/0164698 A1 | 5/2022 | Chaudhary et al. | |
| 2022/0164873 A1 | 5/2022 | Goel et al. | |
| 2023/0091845 A1* | 3/2023 | Buchmann | G06F 16/258 |
| | | | 707/769 |
| 2023/0105205 A1* | 4/2023 | Buchmann | G06F 16/258 |
| | | | 707/769 |
| 2023/0350886 A1* | 11/2023 | Wu | G06F 16/23 |
| 2023/0376577 A1* | 11/2023 | Flöther | G06N 10/80 |
| 2023/0385248 A1* | 11/2023 | Izenson | G06F 16/212 |
| 2024/0070233 A1* | 2/2024 | Blackburn | G06F 16/909 |

OTHER PUBLICATIONS

Kou, Xifeng, "Data Repair Method based on Timeliness and Conditional Function Dependency Rules", ICCPR '19: Proceedings of the 2019 8th International Conference on Computing and Pattern Recognition pp. 57-64, (Oct. 2019), 8 pgs.

* cited by examiner

METADATA QUALITY MONITORING AND REMEDIATION

TECHNICAL FIELD

Embodiments described herein generally relate to management of metadata consistency management and, in some embodiments, more specifically to metadata quality monitoring and remediation through assessment of integrity gaps.

BACKGROUND

Metadata for a data asset provides a description of the data asset (e.g., who created the data asset, a team responsible for the data asset, etc.). Data assets are spread around a computing environment. Organizational changes to applications, personnel, and regulatory compliance may result in stale (e.g., incorrect, inaccurate, etc.) metadata. An organization may desire to keep metadata accurate as organizational changes occur to allow accurate identification of resources associated with the data asset.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Multiple information technology teams may create individual processes that analyze data, identify discrepancies, and task other information technology teams with resolving those discrepancies in metadata that describes data assets (e.g., databases, software applications, computing systems, etc.) in a computing environment. For example, an application may have a designated developer as metadata and a human resources database may include a record for an employee. The employee may leave the company and may be removed from the human resources data or the employee record may contain an inactive record in a status field. Metadata designating the employee as the developer may remain in the application metadata even though the employee is no longer with the company. This leads to stale metadata with inaccurate entries.

Having multiple teams with multiple data assets with varying metadata integrity requirements results in redundant manual controls, generation of numerous emails and reports for other teams to review, understand, and resolve. A lack of central monitoring of the number of integrity discrepancies prevents organizational leadership from prioritizing preventative solutions to high priority or recurring metadata integrity issues.

While the examples of the systems and techniques described herein focus on information technology assets, the systems and techniques described herein are applicable to any data assets that use metadata.

The systems and techniques described herein provide a solution for managing metadata integrity to provide data quality monitoring and remediation by consolidating metadata processes and controls to provide consistent reporting to teams responsible for resolving discrepancies and captures and reports on volumes and trends in integrity discrepancies to enable understanding of issues and prioritization of preventative opportunities.

Rule logic and rule service level agreements (SLA) are defined and daily system of record (SOR) information is aggregated to update integrity gaps (IGs). Integrity gaps are identified as discrepancies between the SOR information and integrity rules processed by a rules engine. Open IGs are reported and remediated and fed back into the effected SOR. The updated SOR data is aggregated again and evaluated to verify the IG has been resolved.

Integrity requirements are defined as unique rules. Integrity rules are generated using integrity data provided from subject matter experts (SMEs). Rules are defined, tested, and deployed based on logic created based on the integrity data. The logic of the integrity rules is added into executable instructions executed by the rules engine. In an example, the executable rules may be a procedure call that is stored within an integrity database. Integrity rules may be modified based on requirements changes.

Rules are assigned to a cycle that defines a person or team responsible for resolving IGs and a service level agreement (SLA) for resolving an IG identified by an integrity rule. There are two types of time periods used to define SLA due dates: (1) standard timeline-sets a defined number of days from the time an IG is identified until the due date and (2) custom timeline-defines a specific due date for IG identified within a date range. For example: IG identified between May 13, 2022 and May 26, 2022 based on an integrity rule may be assigned a due date of Jun. 5, 2022.

At an interval (e.g., weekly, daily, hourly, etc.), information from various SORs is loaded into the integrity database and normalized through a defined extract transform and load (ETL) process. The normalized SOR data is evaluated by the rules engine to identify new IGs and update existing IGs. An IG is created as an individual record in the integrity database that identifies a match between one or more requirement of an integrity rule. IGs identified for rules are written to and stored in a single gap record (GR) table. There are three updates that may be made when the rules engine evaluates the SOR information.

(1) Identify a new IG-if a gap is identified for a record that does not have an open IG for the integrity rule, a new IG is created. A record ID, integrity rule, asset identifier, current field value(s) that matches the integrity rule requirement, and date identified are recorded as a unique IG record. A status value of open is assigned to the IG record and the cycle and due date are populated.

(2) An existing IG still matches the integrity rule requirement—the current date is recorded as the date last identified for the IG.

(3) An existing IG does not match the integrity rule requirement—the current date is recorded as the date resolved and the status is updated to closed.

Details for each IG with a status of open are included in an open gaps (OG) view. The OG view contains a variety of information that may be combined with additional data for custom reporting needs as required. Information included in the OG view may include, by way of example and not limitation, IG ID (unique identifier for each IG), Record Owner (leadership information pertaining to group responsible for resolving), Rule name, IT asset Identifier, Current field value(s) that match the Rule requirements, IG Status, Date IG was identified, Last date IG was identified in the Rule Engine Process, Cycle, and Due Date.

A graphical dashboard is generated that displays the OG information. Teams responsible for remediation of IGs are presented the dashboard to identify action items. Details for all IG are included in an all gaps (AG) view. The AG view is generated with graphical dashboards and includes reporting controls. The AG view may include controls that include, but are not limited to, controls to identify a volume (e.g., as of a specific date, trend over time, etc.) of IG per Rule. The data presented in the AG view enables identification and prioritization of remediation for preventing IGs.

IGs are resolved when appropriate corrections are made in one or more SOR. Changes made to SORs are monitored as a part of the SOR aggregation and integrity gap updating.

Figure 1:
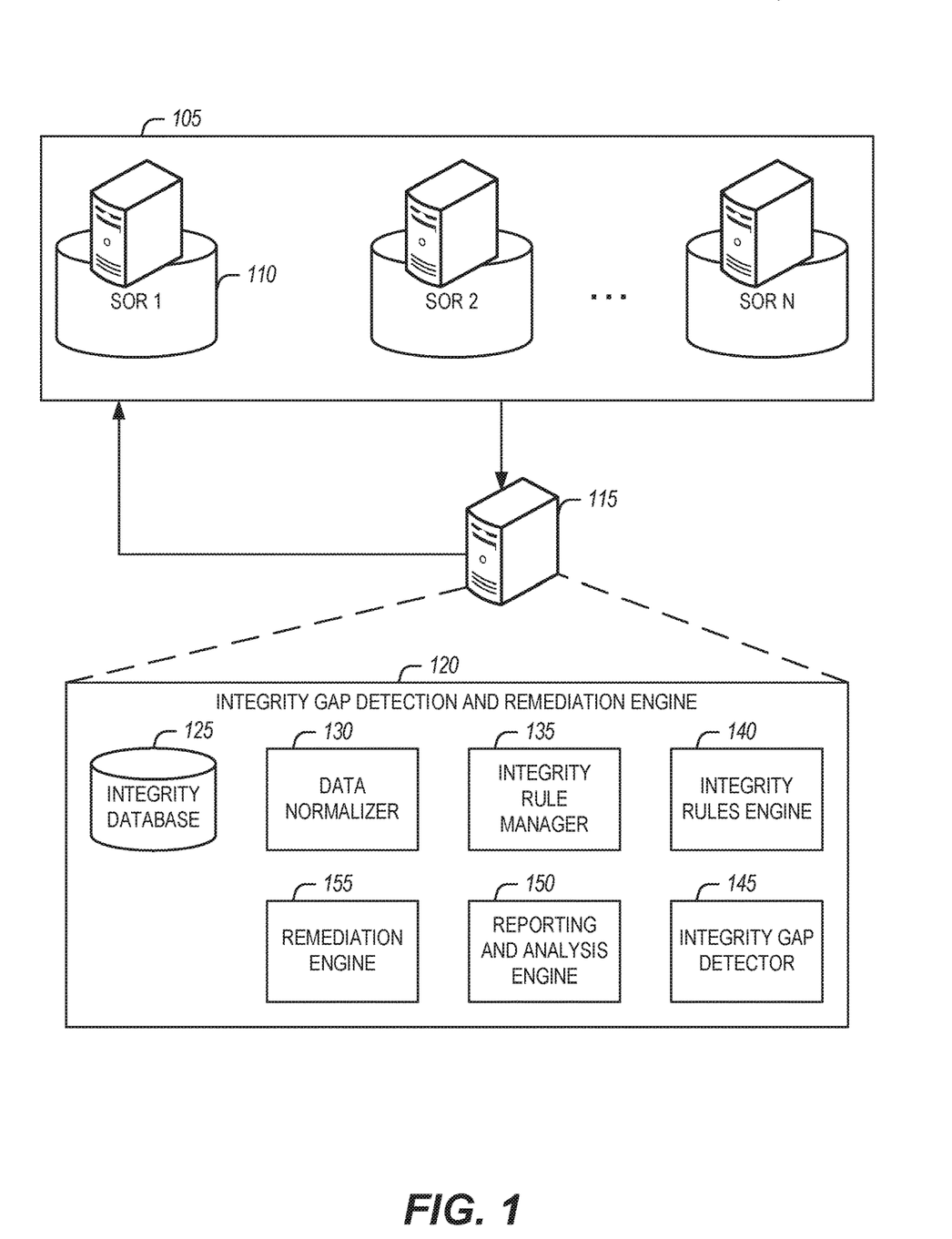
FIG. 1 is a block diagram of an example of an environment and a system for metadata quality monitoring and remediation, according to an embodiment.

FIG. 1 is a block diagram of an example of an environment 100 and a system 120 for metadata quality monitoring and remediation, according to an embodiment. The example environment 100 includes systems of record (SOR) 105 that may include a variety of systems 110 that provide data to a metadata quality and monitoring and remediation server 115. The metadata quality and monitoring and remediation server 115 includes the example system 120. In an example, the metadata quality and monitoring and remediation server 115 may be a standalone server, a cluster of servers, a service executing on the network, a cloud computing service, a field-programmable gate array (FPGA), and application specific integrated circuit (ASIC), or other computing device capable of executing machine-readable instructions comprising the functions of the system 120.

In an example, the system 120 may be hardware or software instructions that, when executed by the metadata quality and monitoring and remediation server 115, cause at least one processor of the metadata quality and monitoring and remediation server 115 to perform operations of the components of the system 120. In an example, the system may be an integrity gap detection and remediation engine. The example system 120 includes a variety of components including an integrity database 125, a data normalizer 130, an integrity rule manager 135, an integrity rules engine 140, an integrity gap detector 145, a reporting and analysis engine 150, and a remediation engine 155.

The SOR 105 may include a variety of systems such as system 110 that may perform a variety of computing functions in a computing network. For example, the system 110 may be an application server, a human resources database, a configuration management database, a compliance management system, an enterprise resource planning system, etc. The SOR 105 include a variety of data in a variety of formats. For example, a variable or field value for an employee data element in a human resources database may be different than a variable or field value for a developer in an application server. The data normalizer 130 obtains data from the SOR 105 and aggregates and normalizes the data by mapping the data elements among the SOR 105 and converting the data to a standard format. For example, the employee data in the human resource database may be mapped to the developer data in the application server and a copy of the records may be generated in a standard format or transformation rules may be stored in the integrity database 125 that provide for conversion of the data to a standard format.

The integrity rule manager 135 identifies integrity requirements for SOR 105 data. The integrity requirements may include, but are not limited to, compliance requirements (e.g., payment card industry (PCI) requirements, credit card information (CCI) requirements, Sarbanes-Oxley requirements, Gramm-Leach-Bliley Act requirements, California Consumer Privacy Act requirements, etc.), security requirements, data classifications (e.g., internal use, public use, confidential, restricted, etc.), personnel update requirements, encryption requirements, access control requirements, etc. The integrity requirements may be identified by requirements and/or features of an application and the integrity rules may be generated to apply the integrity rules to applications and data. For example, a new regulation may require that a telephone number be masked in data that is accessible by internal personnel without security clearance and the integrity rule may identify data from the SOR 105 that is accessible to personnel without security clearance. The identified data may be evaluated by the integrity rule to verify that telephone number data is masked. In an example, an application may have a requirement that a designated developer be updated when there are personnel changes. An integrity rule may be generated that identifies the designated developer of the application for identification in a human resources database to verify that the developer is an active employee and is still in a developer role.

In an example, a machine learning processor may generate a machine learning model using supervised or unsupervised training that identifies integrity requirements based on features identified in application, data, and compliance requirements obtained from the SOR 105 and/or from configuration requirements data input into the machine learning model. For example, a requirements document may be input for evaluation by the machine learning model and the machine learning model may output one or more integrity rules based on the evaluation of data include in the requirements document. For example, the telephone number masking integrity rule and the developer information update integrity rule may be output based on data indicating a requirement for compliance to a regulation and timeliness of developer information updates. In an example, profiles may be generated for various requirements. For example, a new regulation may have a variety of compliance requirements that may be combined into a profile for the regulation. If compliance to the regulation is a requirement for a system then the profile may be applied to the system that applies the combined integrity rules.

The integrity rules and profiles are stored in the integrity database 125. The integrity rules engine 140 obtains the normalized data from the SOR 105 from the data normalizer 130 and the integrity rules from the integrity database 125. The normalized data is evaluated using the integrity rules by the integrity gap detector 145 to identify discrepancies between the SOR 105 data and the integrity rules. In an example, the integrity rules may be stored procedures of the integrity database 125 and the stored procedures may be executed by the integrity rules engine 140 to provide output data based on evaluation of the integrity rules to the normalized data from the SOR 105. The integrity gap detector 145 receives the output data to find integrity gaps in the data and adds detected integrity gaps to the integrity database 125.

The reporting and analysis engine 150 obtains integrity gap data from the integrity database 125 analyzes the integrity gap data and generates reports to be displayed to a user associated with the integrity rule that was violated leading to detection of the integrity gap. An integrity rule includes a responsible party (team, employee, etc.) that is associated with the rule. The responsible party is responsible for remediation of integrity gaps detected by the integrity gap detector 145. The reporting an analysis engine 150 generates a variety of user interfaces including dashboards and other user interface elements and controls that enable the responsible party to identify integrity gaps to be remediated. The reporting and analysis engine 150 may generate dashboards that include controls for searching, sorting, and remediating integrity gaps. For example, a user interface control may be generated that enables a user to search for integrity gaps that have reoccurred over a period of time (e.g., days, weeks, months, etc.) to provide insight into integrity gaps that may require a change to an underlying process, system, etc. to prevent the integrity gap from reoccurring. In an example, the user interface may include controls that may enable a user to activate the control and the user may be taken to a system that may be used to remediate the integrity gap.

The remediation engine 155 enables remediation of the integrity gaps. For example, there may be an integrity gap detected based on a discrepancy between a developer designated for an application and a human resources database and the user may be taken to the metadata for the application to update the designated developer. The remediation engine 155 may include a set of rules that enable automatic remediation of integrity gaps detected by the integrity gap detector 145. For example, the remediation engine 155 may access an organizational chart for a team that includes/included the designated developer and may assign another employee at a same or higher level in the organizational chart as the designated developer. The automatic remediation may generate a message to the responsible party for approval of the automatic remediation.

In an example, a machine learning processor may generate a remediation machine learning model based on observations of remediations made for various integrity gaps. The remediation machine learning model may receive integrity gaps and available remediations as input and may select a remediation and the data to be applied by the remediation as output. The remediation selected by the remediation machine learning model may be automatically applied or may generate an alert for a user associated with the integrity rule that resulted in the detection of the integrity gap to approve the remediation.

The remediation engine 155 modifies the metadata of the SOR 105 to apply the remediations. When the SOR 105 data is obtained at the next query interval, the modifications are present in the SOR 105 data. The integrity rules engine 140 applies the integrity rules and the integrity gap detector 145 evaluates the output to determine if the integrity gap has been resolved. If so, the integrity database 125 is updated to indicate that the integrity gap has been resolved. If not, the integrity database 125 is updated to reflect the date of detection and the responsible party is notified that additional remediation is necessary. In an example, an integrity rule may include an escalation path for detected integrity gaps. For example, there may be a hierarchical list of responsible parties and a remediation time interval may be defined at each level of the hierarchy. If the aging of an integrity gap extends into the next time interval, a responsible party at that level of the hierarchy may be notified of the integrity gap, a data of first detection, and any remediations made to date.

Figure 2:
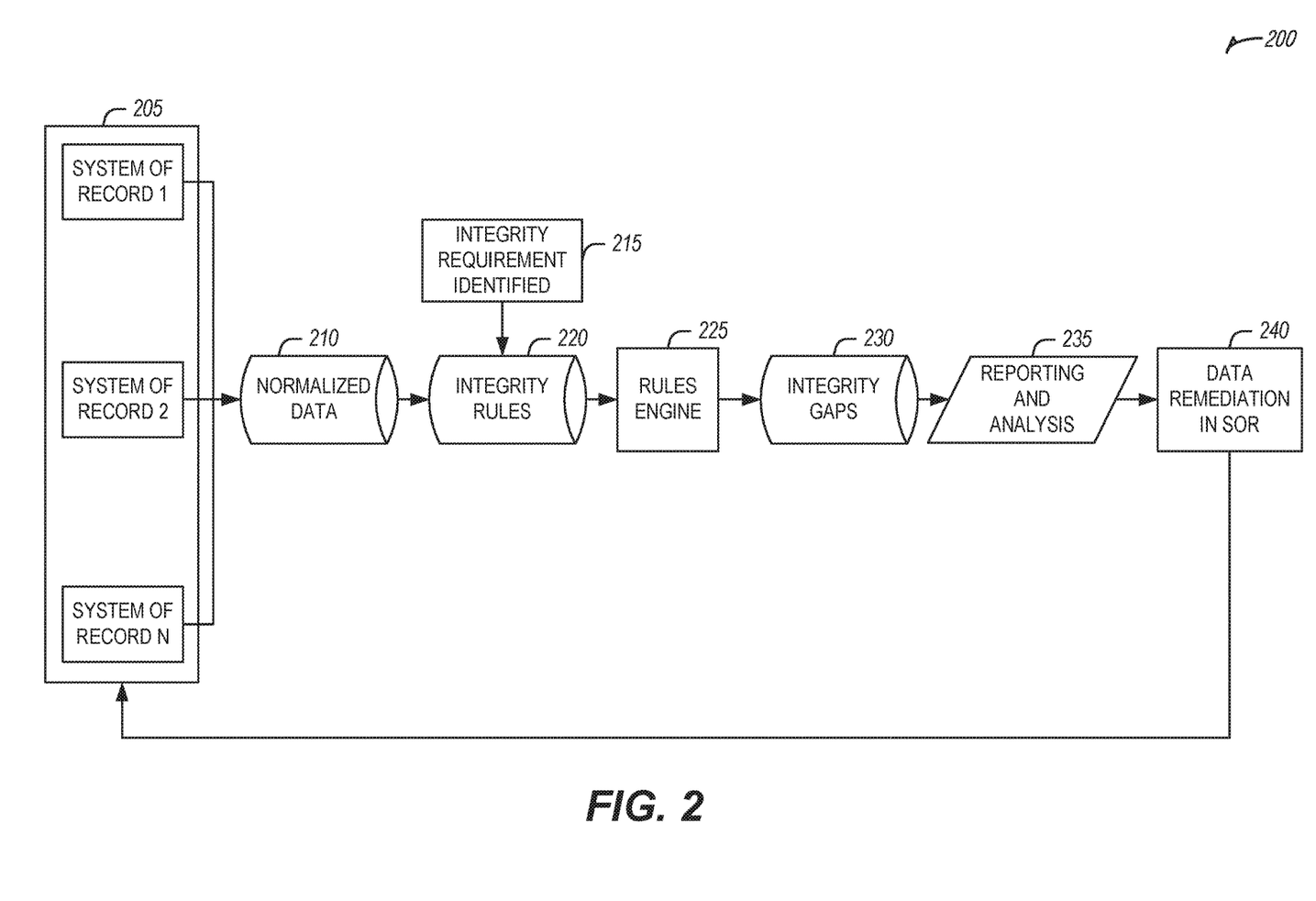
FIG. 2 illustrates an example data flow diagram for metadata quality monitoring and remediation, according to an embodiment.

FIG. 2 illustrates an example data flow diagram 200 for metadata quality monitoring and remediation, according to an embodiment. The data flow diagram 200 provides features as described in FIG. 1.

Data is obtained from systems of record (SOR) (e.g., at operation 205). The data is normalized (e.g., by the data normalizer 130 as described in FIG. 1, etc.) to generate a standardized data set mapped to data from the SOR (e.g., at operation 210).

Integrity requirements are identified (e.g., at operation 215) and corresponding integrity rules are generated (e.g., by the integrity rule manager 135 as described in FIG. 1, etc.) based on the integrity requirements (e.g., at operation 220). The normalized SOR data is evaluated (e.g., the integrity rules engine 140 as described in FIG. 1, etc.) by applying the integrity rules to the SOR data (e.g., at operation 225). Integrity gaps are identified (e.g., by the integrity gap detector 145 as described in FIG. 1, etc.) based on discrepancies between the integrity rules and the normalized data from the SOR (e.g., at operation 230).

The integrity gaps are analyzed (e.g., by the reporting and analysis engine 150 as described in FIG. 1, etc.) to generate reports of integrity gaps to be transmitted/displayed to corresponding users (e.g., at operation 235). Remediation is performed (e.g., via the remediation engine 155 as described in FIG. 1, etc.) on the SOR data to correct integrity gaps and the corrected data is fed back into the SOR (e.g., at operation 240). The example data flow 200 continues by reevaluating the SOR data to verify the integrity gaps have been resolved and to generate additional notifications to a responsible party if the integrity gaps are not resolved within a designated time window.

Figure 3:
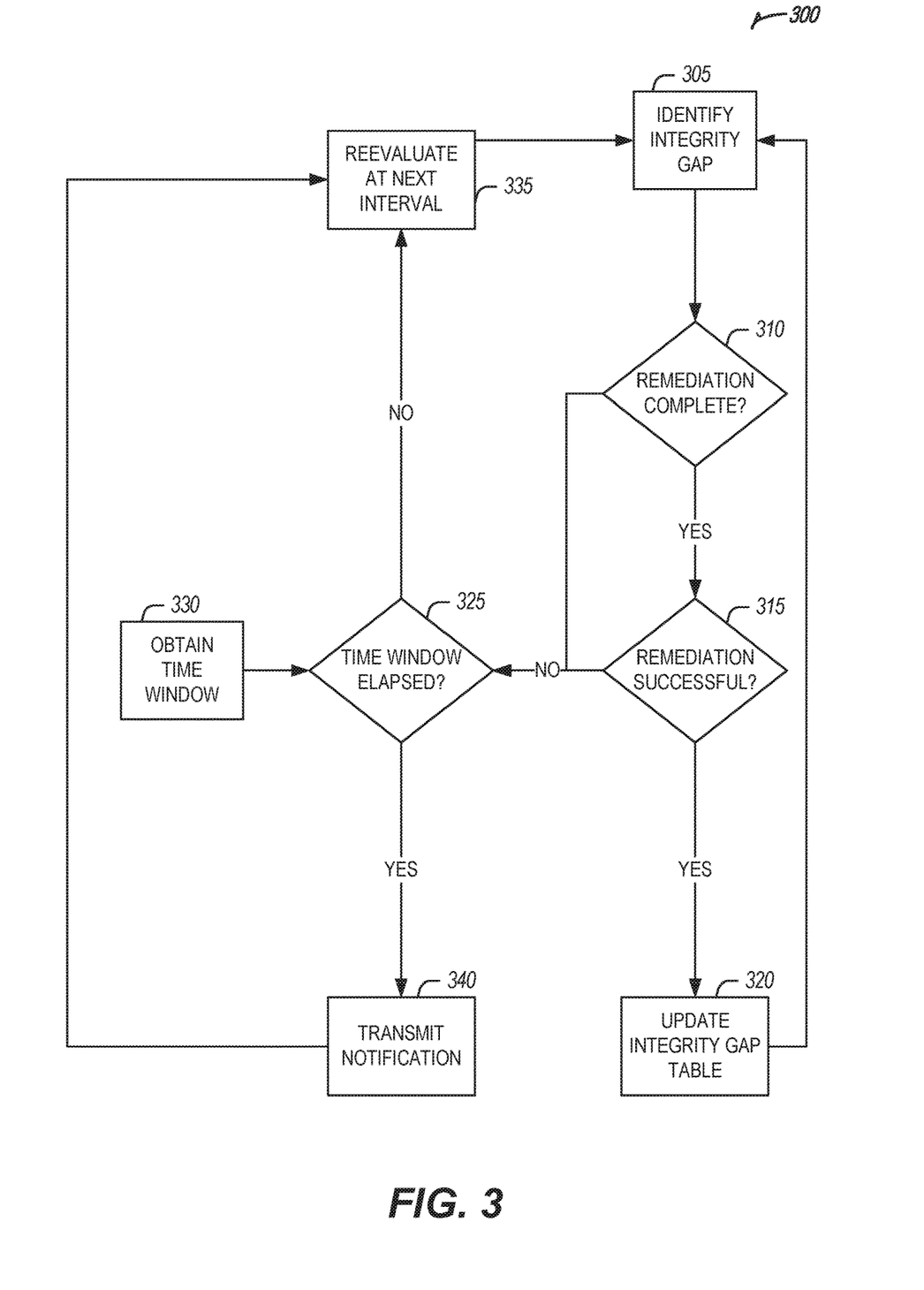
FIG. 3 illustrates an example of a process for remediation verification for metadata quality monitoring and remediation, according to an embodiment.

FIG. 3 illustrates an example of a process 300 for remediation verification for metadata quality monitoring and remediation, according to an embodiment. The process 300 may provide features as described in FIGS. 1 and 2.

An integrity gap is identified (e.g., by the integrity gap detector 145 as described in FIG. 1, etc.) based on a discrepancy between SOR data and an integrity rule (e.g., at operation 305). It is determined (e.g., by the remediation engine 155 as described in FIG. 1, etc.) if remediation has been completed for the integrity gap (e.g., at operation 310). It is determined (e.g., by the remediation engine 155 and/or the integrity gap detector 145 as described in FIG. 1, etc.) if remediation was successful (at operation 315). If remediation was completed (e.g., as determined at operation 310) successfully (e.g., as determined at operation 315), an integrity gap table is updated (e.g., at operation 320) and integrity gap identification resumes (e.g., at operation 305). In an example, the integrity gap table is a table in an integrity database (e.g., the integrity database 125 as described in FIG. 1, etc.).

If remediation has not been completed (e.g., as determined at operation 310) or if remediation was not successful (e.g., as determined at operation 315), it is determined (e.g., by the remediation engine 155 as described in FIG. 1, etc.) if a time window for completing remediation has elapsed (e.g., at operation 325). A time window is obtained (e.g., by the remediation engine 155 as described in FIG. 1, etc.) for the integrity gap (e.g., at operation 330). The time window may be a standard time window or may be an SLA based time window that is calculated based on a criticality value configured for an integrity rule that was used to identify the integrity gap. If the time window for remediation has elapsed (e.g., as determined at operation 325), a notification is transmitted to a party responsible for remediation (e.g., at operation 340). The responsible party may be identified from the integrity rule. In an example, the integrity rule may have a variety of time windows that trigger escalation of notifications to a variety of responsible parties. For example, a first time window may elapse resulting in notification of a first responsible party. Subsequently, a second time window may elapse resulting in notification of a second responsible party.

The integrity gap is reevaluated (e.g., by the integrity gap detector 145 as described in FIG. 1, etc.) at the next SOR data evaluation interval (e.g., at operation 335). If the remediation time window has not elapsed (e.g., as determined at operation 325), the integrity gap is monitored by reevaluating the integrity gap at the next SOR evaluation interval (e.g., at operation 335).

Figure 4:
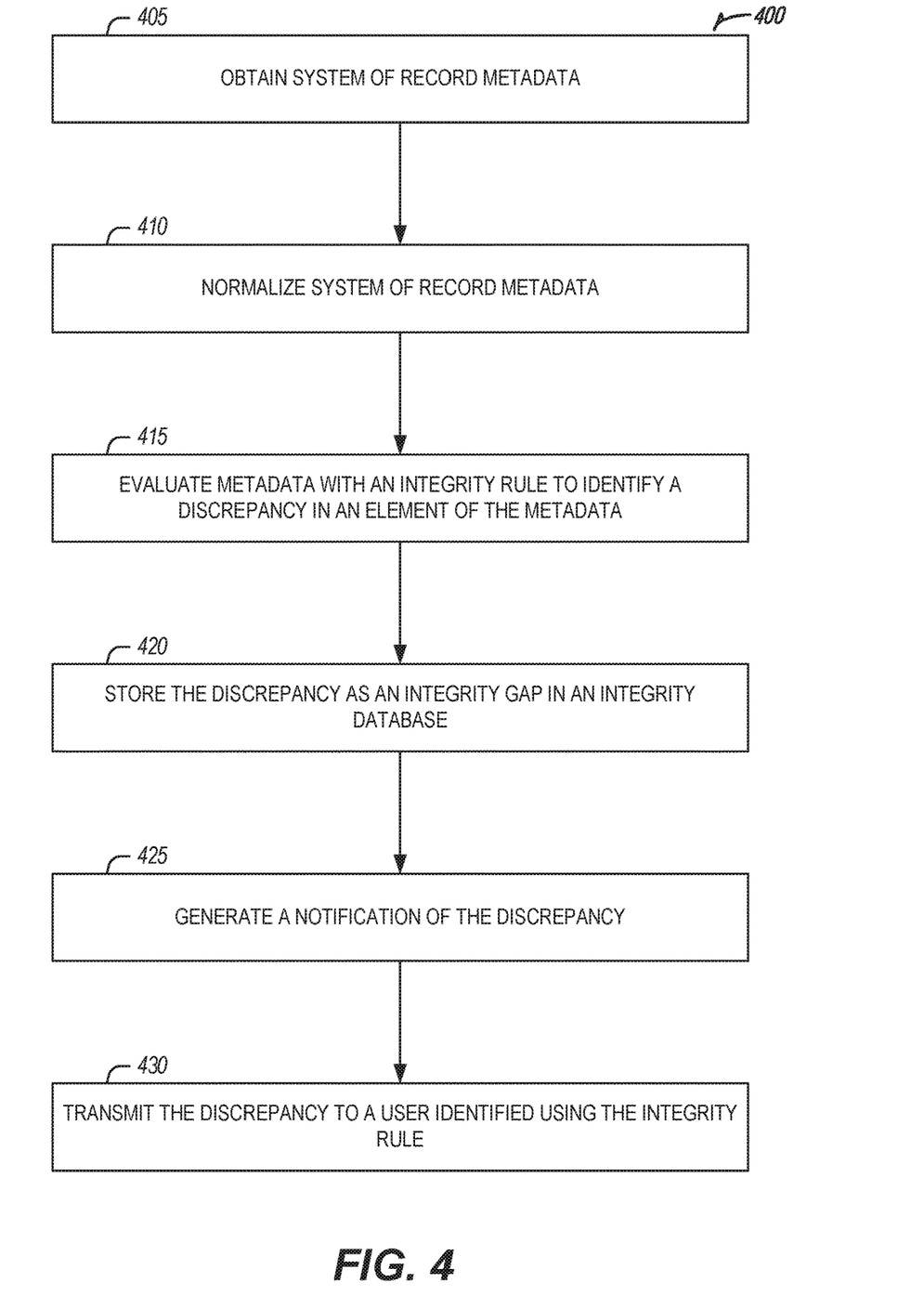
FIG. 4 illustrates an example of a method for metadata quality monitoring and remediation, according to an embodiment.

FIG. 4 illustrates an example of a method 400 for metadata quality monitoring and remediation, according to an embodiment. The method 400 may provide features as described in FIGS. 1 to 3.

Metadata is obtained from a system of record (e.g., at operation 405). The metadata is normalized (e.g., at operation 410). In an example, the system of record may be an application server, a human resources database, or a configuration database.

The metadata is evaluated with an integrity rule to identify a discrepancy in an element of the metadata (e.g., at operation 415). In an example, a requirements dataset may be input into an integrity rule machine learning model to output at least one integrity requirement. Rule logic may be generated for identification of a discrepancy between the at least one integrity requirement and the metadata as the integrity rule and the integrity rule may be stored in the integrity database. In an example, the rule logic may be generated as a stored procedure call and the integrity rule is saved in the integrity database as the stored procedure call.

In an example, data may be obtained from a second system of record. The data from the second system of record may be normalized. A verification element of the data may be identified that corresponds to the element of metadata. The verification element may be compared to the element and the discrepancy may be identified based on a mismatch between the verification element and the element.

In an example, a relationship may be determined among a set of integrity rules. An integrity rule profile may be generated based on the relationship. The set of integrity rules may be added to the integrity rule profile. The integrity rule profile may be selected as the integrity rule profile in response to a determination that the metadata is associated with the integrity rule profile and the metadata may be evaluated with the set of integrity rules.

The discrepancy is stored as an integrity gap in an integrity database (e.g., at operation 420). A notification is generated that includes identification of the element of the metadata and a description of the integrity rule (e.g., at operation 425). The notification is transmitted to a user identified based on the integrity rule (e.g., at operation 430).

In an example, a user interface may be generated for display on a computing device. A graphical dashboard may be created that includes the element of the metadata and a description of the integrity rule and the graphical dashboard may be transmitted to the user interface.

In an example, remediation data may be obtained for the element. The metadata of the system of record may be updated. Updated metadata may be obtained from the system of record. The metadata may be reevaluated with the integrity rule to determine that the discrepancy in the element of the metadata has been resolved and a record for the integrity rule may be updated in the integrity database.

In an example, remediation data may be obtained for the element. The metadata of the system of record may be updated. Updated metadata may be obtained from the system of record. The metadata may be reevaluated with the integrity rule to determine that the discrepancy in the element of the metadata has not been resolved. It may be determined that a time window for remediation of the element has elapsed. A notification may be generated that includes the element, a description of the integrity rule, and an indication that the time window has elapsed and the notification may be transmitted to a user associated with the integrity rule. In an example, the time window may be a default time window or a time window associated with a service level agreement (SLA), wherein the time window associated with the SLA is calculated based on the SLA and a criticality value configured for the integrity rule. In an example, it may be determined that a second time window for remediation of the element has elapsed. A responsible party associated with the second time window may be identified using the integrity rule and the notification may be transmitted to the responsible party.

In an example, a remediation machine learning model may be generated for the element based by evaluating a set of training data including past remediation actions for the integrity gap. The integrity gap may be evaluated using the remediation machine learning model to output an automatic remediation action for the element and the automatic remediation action may be applied to the element. In an example, a notification may be generated that includes the element, a description of the integrity rule, and an indication of the automatic remediation action and the notification may be transmitted to a user associated with the integrity rule. The automatic remediation action may be applied to the element upon receipt of an approval response from the user in response to the notification.

Figure 5:
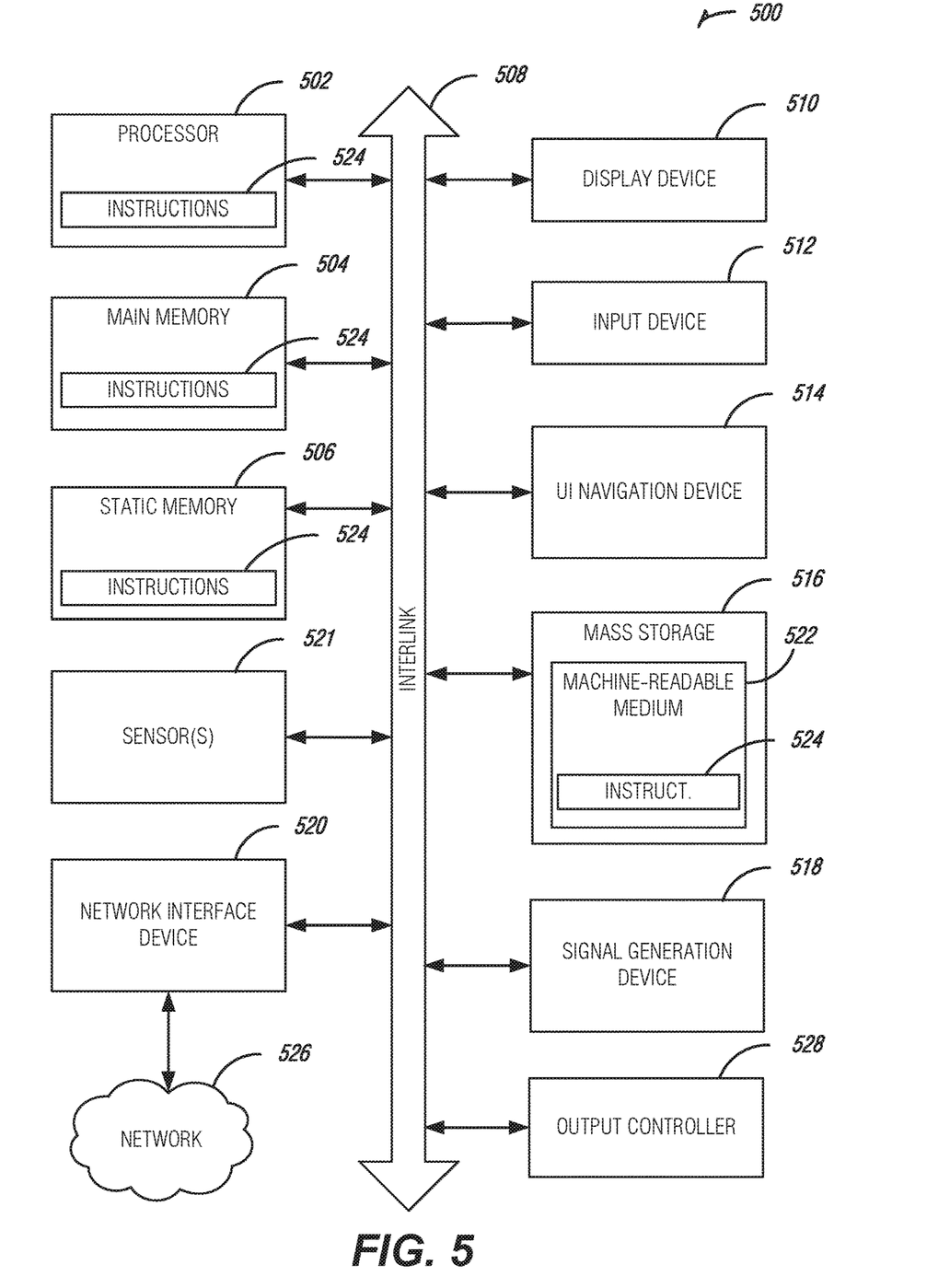
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensors. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for metadata monitoring and remediation comprising:
   at least one processor; and
   memory including instructions that, when executed by the at least one processor, cause the at least one processor to perform operations to:
   obtain metadata from a system of record;
   normalize the metadata;
   input a requirements dataset into an integrity rule machine learning model to output at least one integrity requirement;
   generate rule logic for identification of a discrepancy between the at least one integrity requirement and the metadata as an integrity rule, wherein the rule logic is generated as a stored procedure call;
   evaluate the metadata with the integrity rule to identify a discrepancy in an element of the metadata;
   store the discrepancy as an integrity gap in an integrity database;
   generate a notification that includes identification of the element of the metadata and a description of the integrity rule; and
   transmit the notification to a user identified based on the integrity rule.

2. The system of claim 1, the memory further comprising instructions that, when executed by the at least one processor, cause the at least one processor to perform operations to:
   store the integrity rule in the integrity database.

3. The system of claim 2, wherein the integrity rule is saved in the integrity database as the stored procedure call.

4. The system of claim 1, wherein the system of record is an application server, a human resources database, or a configuration database.

5. The system of claim 1, the instructions to evaluate the metadata with the integrity rule to identify the discrepancy in the element of the metadata further comprising instructions that, when executed by the at least one processor, cause the at least one processor to perform operations to:
   obtain data from a second system of record;
   normalize the data from the second system of record;
   identify a verification element of the data that corresponds to the element of metadata;
   compare the verification element to the element; and
   identify the discrepancy based on a mismatch between the verification element and the element.

6. The system of claim 1, the memory further comprising instructions that, when executed by the at least one processor, cause the at least one processor to perform operations to:
   generate a user interface for display on a computing device;
   create a graphical dashboard that includes the element of the metadata and a description of the integrity rule; and
   transmit the graphical dashboard to the user interface.

7. The system of claim 1, the memory further comprising instructions that, when executed by the at least one processor, cause the at least one processor to perform operations to:
   determine a relationship among a set of integrity rules;
   generate an integrity rule profile based on the relationship;
   add the set of integrity rules to the integrity rule profile; and
   in response to determination that the metadata is associated with the integrity rule profile, select the integrity rule profile as the integrity rule profile, wherein the metadata is evaluated with the set of integrity rules.

8. The system of claim 1, the memory further comprising instructions that, when executed by the at least one processor, cause the at least one processor to perform operations to:
   obtain remediation data for the element;
   update the metadata of the system of record;
   obtain updated metadata from the system of record;
   reevaluate the metadata with the integrity rule to determine that the discrepancy in the element of the metadata has been resolved; and
   update a record for the integrity rule in the integrity database.

9. The system of claim 1, the memory further comprising instructions that, when executed by the at least one processor, cause the at least one processor to perform operations to:
   obtain remediation data for the element;
   update the metadata of the system of record;
   obtain updated metadata from the system of record;
   reevaluate the metadata with the integrity rule to determine that the discrepancy in the element of the metadata has not been resolved;

determine that a time window for remediation of the element has elapsed;

generate a notification that includes the element, a description of the integrity rule, and an indication that the time window has elapsed; and transmit the notification to a user associated with the integrity rule.

10. The system of claim 9, wherein the time window is a default time window or a time window associated with a service level agreement (SLA), wherein the time window associated with the SLA is calculated based on the SLA and a criticality value configured for the integrity rule.

11. The system of claim 9, the memory further comprising instructions that, when executed by the at least one processor, cause the at least one processor to perform operations to:

determine that a second time window for remediation of the element has elapsed;

identify a responsible party associated with the second time window using the integrity rule; and transmit the notification to the responsible party.

12. The system of claim 1, the memory further comprising instructions that, when executed by the at least one processor, cause the at least one processor to perform operations to:

generate a remediation machine learning model for the element based by evaluating a set of training data including past remediation actions for the integrity gap;

evaluate the integrity gap using the remediation machine learning model to output an automatic remediation action for the element; and apply the automatic remediation action to the element.

13. The system of claim 12, the memory further comprising instructions that, when executed by the at least one processor, cause the at least one processor to perform operations to:

generate a notification that includes the element, a description of the integrity rule, and an indication of the automatic remediation action; and transmit the notification to a user associated with the integrity rule, wherein the automatic remediation action is applied to the element upon receipt of an approval response from the user in response to the notification.

14. At least one non-transitory machine-readable medium including instructions for metadata monitoring and remediation that, when executed by at least one processor, cause the at least one processor to perform operations to:

obtain metadata from a system of record;

normalize the metadata;

input a requirements dataset into an integrity rule machine learning model to output at least one integrity requirement;

generate rule logic for identification of a discrepancy between the at least one integrity requirement and the metadata as an integrity rule, wherein the rule logic is generated as a stored procedure call;

evaluate the metadata with the integrity rule to identify a discrepancy in an element of the metadata;

store the discrepancy as an integrity gap in an integrity database;

generate a notification that includes identification of the element of the metadata and a description of the integrity rule; and transmit the notification to a user identified based on the integrity rule.

15. The at least one non-transitory machine-readable medium of claim 14, further comprising instructions that, when executed by the at least one processor, cause the at least one processor to perform operations to:

store the integrity rule in the integrity database.

16. The at least one non-transitory machine-readable medium of claim 15, wherein the integrity rule is saved in the integrity database as the stored procedure call.

17. The at least one non-transitory machine-readable medium of claim 14, the instructions to evaluate the metadata with the integrity rule to identify the discrepancy in the element of the metadata further comprising instructions that, when executed by the at least one processor, cause the at least one processor to perform operations to:

obtain data from a second system of record;

normalize the data from the second system of record;

identify a verification element of the data that corresponds to the element of metadata;

compare the verification element to the element; and identify the discrepancy based on a mismatch between the verification element and the element.

18. The at least one non-transitory machine-readable medium of claim 14, further comprising instructions that, when executed by the at least one processor, cause the at least one processor to perform operations to:

obtain remediation data for the element;

update the metadata of the system of record;

obtain updated metadata from the system of record;

reevaluate the metadata with the integrity rule to determine that the discrepancy in the element of the metadata has been resolved; and update a record for the integrity rule in the integrity database.

19. A method for metadata monitoring and remediation comprising:

obtaining metadata from a system of record;

normalizing the metadata;

inputting a requirements dataset into an integrity rule machine learning model to output at least one integrity requirement;

generating rule logic for identification of a discrepancy between the at least one integrity requirement and the metadata as an integrity rule, wherein the rule logic is generated as a stored procedure call;

evaluating the metadata with the integrity rule to identify a discrepancy in an element of the metadata;

storing the discrepancy as an integrity gap in an integrity database;

generating a notification that includes identification of the element of the metadata and a description of the integrity rule; and transmitting the notification to a user identified based on the integrity rule.

20. The method of claim 19, further comprising:

storing the integrity rule in the integrity database.

21. The method of claim 19, further comprising:

obtaining remediation data for the element;

updating the metadata of the system of record;

obtaining updated metadata from the system of record;

reevaluating the metadata with the integrity rule to determine that the discrepancy in the element of the metadata has not been resolved;

determining that a time window for remediation of the element has elapsed;

generating a notification that includes the element, a description of the integrity rule, and an indication that the time window has elapsed; and transmitting the notification to a user associated with the integrity rule.

22. The method of claim 21, wherein the time window is a default time window or a time window associated with a service level agreement (SLA), wherein the time window associated with the SLA is calculated based on the SLA and a criticality value configured for the integrity rule.

23. The method of claim 21, further comprising:
determining that a second time window for remediation of the element has elapsed;
identifying a responsible party associated with the second time window using the integrity rule; and
transmitting the notification to the responsible party.

24. The method of claim 19, further comprising:
generating a remediation machine learning model for the element based by evaluating a set of training data including past remediation actions for the integrity gap;
evaluating the integrity gap using the remediation machine learning model to output an automatic remediation action for the element; and
applying the automatic remediation action to the element.

* * * * *